United States Patent [19]
Vernaleken et al.

[11] 3,834,441
[45] Sept. 10, 1974

[54] PROCESS FOR CONCENTRATING POLYMER SOLUTIONS BY EVAPORATION

[75] Inventors: Hugo Vernaleken, Krefeld; Otto Court, Neub; Ludwig Bottenbruch; Axel Lippert, both of Krefeld-Bockum, all of Germany

[73] Assignee: Bayer Aktiengesellschaft, Leverkusen, Germany

[22] Filed: Aug. 7, 1972

[21] Appl. No.: 278,693

Related U.S. Application Data

[63] Continuation of Ser. No. 27,078, April 9, 1970, abandoned.

[30] Foreign Application Priority Data
Apr. 25, 1969 Germany.......................... 1921045

[52] U.S. Cl.................. 159/49, 159/6 R, 159/13 R
[51] Int. Cl............................................. B01d 1/22
[58] Field of Search............ 260/47 XA; 159/2, 2 E, 159/6, 28, 28 C, 28 VH, 47, 15

[56] References Cited
UNITED STATES PATENTS

| | | | |
|---|---|---|---|
| 2,467,769 | 4/1949 | Morrow et al...................... | 159/2 X |
| 2,689,839 | 9/1954 | Heckert............................. | 260/37 |
| 2,710,057 | 6/1955 | Bassett et al........................ | 159/2 |
| 2,853,127 | 9/1958 | Sessen................................ | 159/47 |
| 3,073,380 | 1/1963 | Palmason........................... | 159/49 |
| 3,113,843 | 12/1963 | Wen Han Li....................... | 23/85 |
| 3,183,112 | 5/1965 | Gemassmer........................ | 106/316 |
| 3,357,955 | 12/1967 | Bryan................................. | 260/78 |
| 3,386,488 | 6/1968 | Ratzsch et al. .................... | 159/2 |
| 3,453,184 | 7/1969 | Gemassmer et al............... | 159/48 R |
| 3,469,617 | 9/1969 | Palmason........................... | 159/47 |
| 3,550,669 | 12/1970 | Lippert et al. ..................... | 159/6 R |

FOREIGN PATENTS OR APPLICATIONS

| | | | |
|---|---|---|---|
| 735,552 | 5/1966 | Canada............................. | 159/48 R |
| 398 | 1890 | Great Britain.................. | 158/28 VH |

*Primary Examiner*—Jack Sofer
*Attorney, Agent, or Firm*—Burgess, Dinklage & Sprung

[57] ABSTRACT

Polymer solutions are concentrated by evaporation, whereby the solution is heated under pressure and expanded through a nozzle into a coiled tube in which a decreasing pressure gradient is maintained in direction of flow and the gas velocity is increased and the temperature is raised above the melting temperature of the polymer.

2 Claims, 1 Drawing Figure

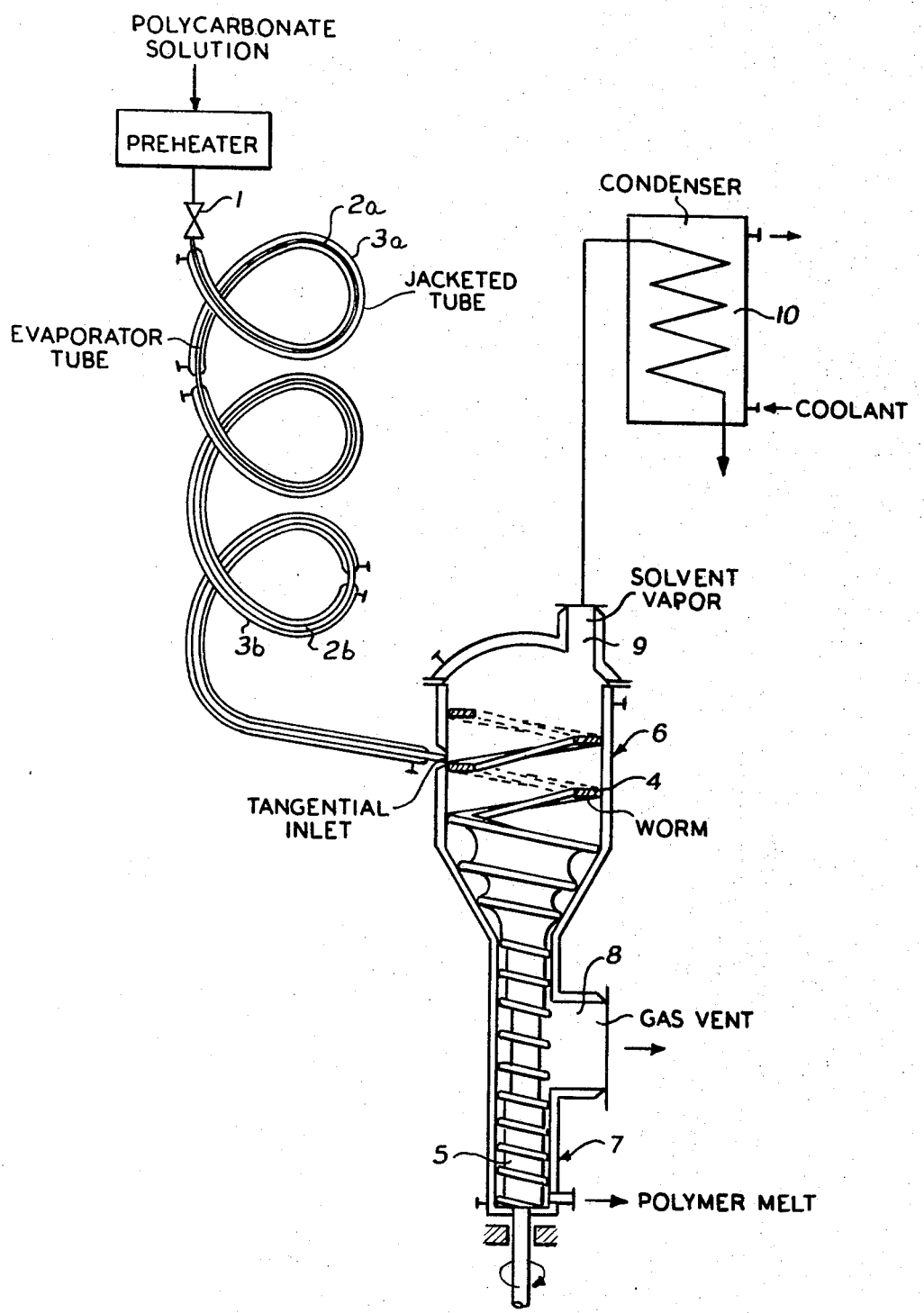

PROCESS FOR CONCENTRATING POLYMER SOLUTIONS BY EVAPORATION

This is a continuation of application Ser. No. 27,078 filed Apr. 9, 1970, now abandoned.

Various apparatus have been described for concentrating polymer solutions by evaporation. These include descending flow evaporators, thin-layer evaporators and screw evaporators. With the conventional descending flow and thin-layer evaporators, a high evaporation efficiency can only be obtained provided the viscosity of the polymer solution is relatively low, since as the viscosity of the solution increases, there is a reduction in heat transfer. Thin-layer evaporators with rotating wiper blades, consume a considerable amount of power and this limits the degree of concentration of the solution which can be usefully achieved. Consequently, screw apparatuses are used for concentrating highly concentrated viscous solutions of polymers which are isolated in these apparatus in the form of their melts. One disadvantage of screws compared to descending flow and thinlayer evaporators is their substantially less satisfactory heat transfer. Consequently, long residence times at high temperatures are necessary which leads to discoloration of the melts and often to damage of the material.

It is known to carry out evaporation processes and reactions in which gas is formed by heating a material under pressure and expanding it through a nozzle into an evaporator tube. The product sprayed from the nozzle is separated during the evaporation by centrifugal forces into a gaseous and a liquid phase and this separation effect is further maintained during the evaporation procedure by conveying the two-phase stream into a helically curved channel, the liquid phase being carried along by the gas phase which flows at a higher speed than the liquid phase.

It has surprisingly been found that polymer solutions can also be concentrated in an evaporation tube, according to the invention, provided that in the direction of flow a. a decreasing pressure gradient is maintained,
 b. an increase in the gas velocity is caused, and
 c. the temperature is maintained above the melting point of the polymer.

This new process combines the advantages of the concentration by evaporation in descending flow and thin-layer evaporators, such as the high evaporation efficiency because of high heat transfer coefficients, and the advantage of screw evaporators, which is the isolation of polymers as melts.

In one advantageous embodiment of the invention, the raising of the temperature is carried out in several stages which are sequential.

In one development of the process according to the invention the cross-section of the stream of polymer solution increases in the direction of flow. This is shown in the accompanying schematic drawing.

The pressure prevents boiling without the attendant formation of bubbles in the initial stage of the evaporation of the polymer solution. As the polymer solution becomes more viscous, the evaporation of the solvent is facilitated by reducing the pressure which results in a more viscous polymer solution. This effect is advantageously obtained by having an evaporator tube which widens out conically. The same effect is caused by the temperature profile in the evaporator tube. As the temperature rises, the more than propotional increase in the viscosity of the polymer solution is compensated for. In this way, high heat transfer is mintained. The temperature is raised in such a way that there is no boiling with its attendant formation of bubbles from any excessive temperature difference between the polymer solution and the tube wall.

BRIEF DESCRIPTION OF THE DRAWING

The accompanying drawing s a diagram showing the helical coil through which a preheated polycarbonate solution is passed en route to a cyclone.

In accordance with the method preheated polymer is preheated in a zone not shown. It is heated to above the boiling point of the solvent under pressure sufficient to maintain the solvent liquid. It is passed through a nozzle 1 and flows into a helically shaped evaporation tube divided into two stages 2a and 2b. The separate evaporator stages have separating heating zones 3a, 3b. The overheated solution is expanded by evaporation in the helically shaped zone, which zone is heated to temperatures above the melting point of the polycarbonate. A decreasing pressure gradient along the passageway within the zone is maintained whereby the gas velocity along the passageway is increased.

The helical evaporation tube opens and tangentially into a cyclone 6 equipped with a band worm 4 and a conveyor worm 5, the polymer melt being continuously discharged from the cyclone. The conveyor worm 5 has a housing 7 which is provided with a gas-venting pipe 8. The solvent vapors leave the cyclone 6 through a vapor pipe 9 and are cooled in a condenser 10.

Another important advantage of the process is the high vapor velocity, which is advantageously so controlled by the dimensions of the evaporator tube and by the temperature and thus by means of the quantity of solvent evaporated that the gas reaches the velocity of sound at the outlet from the evaporator, when the polymer solution is already highly concentrated. By this means, the highly concentrated polymer solution is very strongly sheared. As compared with the shearing of products in screw evaporators, very high shearing forces are reached and thus good heat transfer is promoted. The high gas velocity propels the highly viscous polymer solution and the melt.

This process thus makes it possible for dilute polymer solutions to be completely concentrated by evaporation in a simple apparatus without moving parts and for the polymer concentrated to be isolated as a melt.

Example:

A polycarbonate solution pre-heated to 130° C. and under a pressure of 5 atm gauge is expanded through an expansion nozzle into a tube which has an internal diameter of 10 mm and a length of 7,000 mm. The tube is heated from outside over half its length at a temperature of from 160° to 300° C. The separation of the gas liquid mixture takes place in a cyclone, which is provided with a discharge screw. Starting with a 10 percent solution of a polycarbonate in a solvent composed of 70 parts of methylene chloride, 30 parts of chlorobenzene, a polycarbonate melt is obtained at a rate of 20 kg of polycarbonate per hour. The residual solvent content is 1 percent. The viscosity of the melt is 5,000 poises.

One embodiment of the process and a basic apparatus for carrying out the proces are described with reference to the accompanying drawings.

The polymer solution is pre-heated under a pressure which is sufficient to prevent the formation of a gas phase of the solvent. The polymer solution is then expanded through a nozzle 1 and introduced into an evaporation tube divided into two stages 2a and 2b. The separate evaporator stages have separating heating zones 3a, 3b. The evaporation tube opens tangentially into a cyclone 6 equipped with a band worm 4 and a conveyor worm 5, the polymer melt being continuously discharged from the cyclone. The conveyor worm 5 has a housing 7 which is provided with a gas-venting pipe 8. The solvent vapours leave the cyclone 6 through a vapour pipe 9 and are cooled in a condenser 10.

We claim:

1. A continuous process for the production of polycarbonate melts from dilute solutions which comprises the steps of:
    a. preheating the polycarbonate in solution to a temperature above the boiling point of the solvent under pressure sufficient to maintain the solvent in a liquid phase;
    b. thereafter expading the overheated solution by expansion into a vertically axised helically shaped zone, and passing the expanded mass downwardly in said zone which zone is heated in several sequential downward stages in said helical zone at temperatures above the melting point of the polycarbonate;
    c. maintaining a decreasing pressure gradient along the passageway within the zone as said expanded mass moves downwardly therethrough;
    d. whereby the gas velocity along the passageway is increased; and
    e. separating the polycarbonate melt from solvent vapor.

2. A process according to claim 1 wherein the decreasing pressure gradient is maintained by an increasing cross section of the polymer solution in the direction of flow.

* * * * *